(12) United States Patent
Arias

(10) Patent No.: US 7,158,614 B2
(45) Date of Patent: Jan. 2, 2007

(54) METALLIC TEST ACCESS FOR XDSL CONNECTORS

(75) Inventor: Juan Tomas Arias, Madrid (ES)

(73) Assignee: Tyco Electronics Raychem SA, Madrid (ES)

( * ) Notice: Subject to any disclaimer, the term of this patent is extended or adjusted under 35 U.S.C. 154(b) by 0 days.

(21) Appl. No.: 10/505,329

(22) PCT Filed: Sep. 25, 2003

(86) PCT No.: PCT/GB03/04114

§ 371 (c)(1),
(2), (4) Date: Aug. 23, 2004

(87) PCT Pub. No.: WO2004/032563

PCT Pub. Date: Apr. 15, 2004

(65) Prior Publication Data

US 2005/0141695 A1    Jun. 30, 2005

(30) Foreign Application Priority Data

Oct. 3, 2002 (ES) ............... 200202264
Apr. 16, 2003 (ES) ............... 200300915

(51) Int. Cl.
H04M 1/24 (2006.01)
H04M 3/08 (2006.01)
H04M 3/22 (2006.01)
H04M 3/00 (2006.01)
H04M 9/00 (2006.01)

(52) U.S. Cl. ............... 379/27.07; 379/1.01; 379/22.06; 379/325; 379/413.04

(58) Field of Classification Search ............... 379/1.01, 379/1.03, 1.04, 15.01, 19, 22.06, 22.07, 26.01, 379/27.07, 29.05, 29.11, 166, 325, 326, 327, 379/328, 329, 330, 331, 332, 399.01, 413.02, 379/413.03, 413.04

See application file for complete search history.

(56) References Cited

U.S. PATENT DOCUMENTS 6,470,074 B1 * 10/2002 Teixeria ............... 379/32.04
6,496,566 B1 * 12/2002 Posthuma ............... 379/22
6,574,309 B1 * 6/2003 Chea et al. ............... 379/9

(Continued)

FOREIGN PATENT DOCUMENTS

EP    1 193 958    4/2002

(Continued)

OTHER PUBLICATIONS

International Search Report for PCT/GB 03/004114.

*Primary Examiner*—Quoc Tran
(74) *Attorney, Agent, or Firm*—Myers Bigel Sibley & Sajovec

(57) ABSTRACT

A metal port block is used on an intermediate distributor or vertical terminal block in a connection architecture to obtain a metal contact of the combined voice and data signals, which can subsequently be monitored by a test rack, without needing to disconnect or reconnect any bridge or cable. The access to the intermediate distribution frame can be established by a connecting block with which a plurality of boards are associated. The boards are vertically arranged in an array and each incorporates its relays or associated electronics to extract and supply information to a test table. Each board has pins to couple with the cavities of the distribution frame.

19 Claims, 8 Drawing Sheets

U.S. PATENT DOCUMENTS

| | | | |
|---|---|---|---|
| 6,584,148 B1* | 6/2003 | Zitting et al. | 375/222 |
| 6,831,930 B1* | 12/2004 | Swam | 370/535 |
| 2002/0101823 A1* | 8/2002 | Weirich et al. | 370/241 |
| 2002/0196908 A1* | 12/2002 | Hollenbeck et al. | 379/1.04 |
| 2003/0002641 A1* | 1/2003 | Schmokel | 379/166 |

FOREIGN PATENT DOCUMENTS

| | | |
|---|---|---|
| EP | 1 202 541 | 5/2002 |
| WO | 01/65816 | 9/2001 |
| WO | 02/47429 | 6/2002 |

* cited by examiner

METALLIC TEST ACCESS FOR XDSL CONNECTORS

RELATED APPLICATIONS

The present application is a National Phase application of PCT/GB03/04114 filed on Sep. 25, 2003 and published in English, which claims priority from Spanish Application No. P200202264 filed on Oct. 3, 2002 and Spanish Application No. P200300915 filed on Apr. 16, 2003, the disclosures of which are hereby incorporated by reference in their entirety.

BACKGROUND OF THE INVENTION

The present invention relates both to the connection architecture of xDSL networks which have a metal port, and to the terminal block or connection block which is necessary in order to obtain this architecture.

SUMMARY OF THE INVENTION

In order to provide a high-speed data transmission service, for example via the ADSL (Asynchronous Data Subscriber Line) or in general xDSL, it is necessary to combine or separate the voice signal, which is transmitted by the switching exchange, and the high-speed data signal xDSL, which is supplied by the digital subscriber line access multiplexer (DSLAM), by means of a filter or splitter which adds or separates the signals, according to whether they are going towards the subscriber or are coming from the subscriber.

The object of the present invention is to develop a connection architecture for xDSL networks, such that the said architecture provides the possibility of having metal ports, i.e. ports which make it possible to carry out inspection of the lines either individually or jointly by means of a test rack, all with the minimum number of modifications, and without needing to alter the wiring which the existing structures have.

A further object of the present invention is to develop a terminal block which makes it possible to obtain the signals, so that they can be conveyed to a test rack.

The present invention thus comes within the scope of telephony, and more specifically that of connection systems for xDSL networks, as well as that of the means which are necessary in order to form these connections.

As previously stated, in order to provide a high-speed data service, for example ADSL (Asynchronous Data Subscriber Line), it is necessary to combine the voice signal obtained from the switching exchange with the high-speed signal xDSL provided by the Digital Subscriber Line Access Multiplexer (DSLAM), i.e. the equipment which is responsible for providing the access to high-speed lines. This adding or separation is carried out by means of a filter or splitter, which is normally installed together with the DSLAM in the same electronic component box.

One of the problems encountered according to the previous configurations is that of being able to provide a metal port which makes it possible to convey the combined signal to a test rack, which makes it possible to determine the state both of the subscriber loop and of the DSLAM.

There have been various attempts to design architectures which assist obtaining of the metal contacts, one of which is based on the use of an additional terminal block disposed on an independent rack of the intermediate distributor, to which rack there is transmitted the combined voice and xDSL signal which is obtained from the DSLAM, before it reaches the intermediate distributor. This solution has the disadvantage that the wiring has to be both disconnected and reconnected, which presupposes a high cost.

Another solution consists of adding to the terminal block of the intermediate distributor the terminal block which makes it possible to obtain the metal contacts, and in this case it would be necessary to rewire the bridge for the combined voice and data signal, another bridge needing to be established between the terminal block of the intermediate distributor and the new terminal block, to make it possible to obtain the metal contacts. Furthermore, another disadvantage of the addition of the terminal blocks with the metal contacts is the fact of requiring twice the space occupied on the intermediate distributor.

The object of the present invention is thus to eliminate the aforementioned disadvantages by providing a new connection architecture for xDSL networks which have a metal port, wherein it is not necessary to disconnect and reconnect the wiring, thus making it possible to obtain quickly and completely the metal port for all the lines, without using extra space on the intermediate distributor, and wherein it is possible to use the systems already in place without needing to make any modifications to them.

The present invention provides connection architecture for xDSL networks with a metal port and terminal block which is necessary for this purpose, having a configuration which makes it possible to have a metal port for each line without needing to disconnect or reconnect the wiring. For this purpose, the architecture has a horizontal terminal block to which there is conveyed the voice signal obtained from switching exchange. From this terminal block and by means of a bridge, the said voice signal continues to reach the intermediate distributor, and from there proceeds via a new cable to the assembly formed by the filter and the DSLAM. The terms "horizontal", "intermediate", and "vertical" as used herein in the context of terminal/distribution blocks/frames and the like are believed to be well understood by persons familiar with the kind of telecommunications equipment to which the present invention generally relates.

The DSLAM is the Digital Subscriber Line Access Multiplexer which is responsible for supplying the high-speed digital signal xDSL. The filter or splitter is responsible for adding or separating the voice signal to/from the high-speed signal xDSL.

For the purpose of obtaining the metal port in its own terminal block of the intermediate distributor, the metal port block is connected to this terminal block, for which purpose the metal port block has some projecting contacts which are disposed such that they make contact on the necessary signals. The projecting contacts which the metal port block has are disposed such that they face the cavities provided in the contacts for cut-off and testing of the combined voice signal plus the high-speed signal xDSL. This does not eliminate the possibility of these contacts being disposed such that they permit access to the voice signal. The contacts with which the terminal block of the intermediate distributor are provided are of the cut-off and testing type, which makes it possible to place the metal port block in series.

The metal contact blocks can be connected to one another by means of a bus which serves all of them, such that the signals of the metal contact blocks are conveyed to the test rack by means of a single bus. It is also possible for the metal contact blocks to be designed such that instead of connection taking place to the intermediate distributor, it takes place to the vertical distributor, to which there is transmitted the combined voice and data signal, such that on some occasions there will be only the voice signal, and on others there will be both signals.

The remainder of the configuration consists of the bridge, which conveys the combined voice and data signal, and which extends between the intermediate distributor and the vertical terminal block, and then accesses there a filter which separates the signal once again, to reach the telephone or the computer of the user.

In order to further illustrate the present invention, and for the purpose of assisting understanding of its characteristics, reference is made to the accompanying drawings, which are provided by way of non-limiting example representing preferred aspects of the invention.

DETAILED DESCRIPTION OF EMBODIMENTS OF THE PRESENT INVENTION

Figure 1:
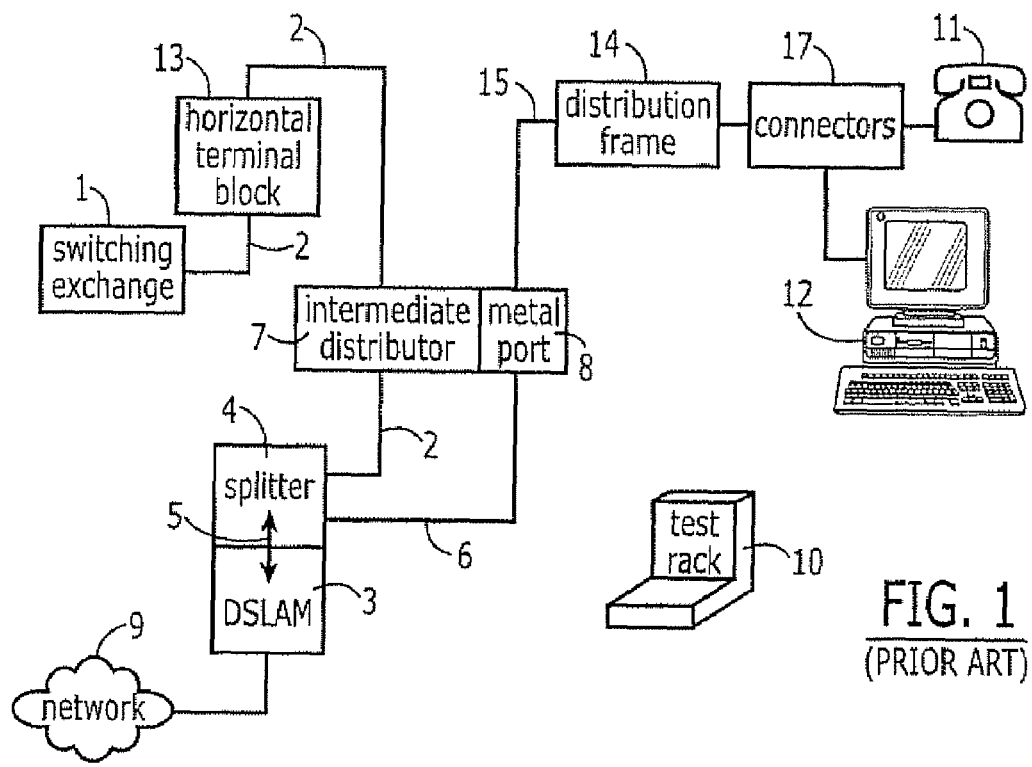
FIG. 1 (Prior Art) shows a known connection architecture for xDSL networks, with the metal contact required.

With reference to the drawings, FIG. 1 shows how, in known systems, from the switching exchange 1, the voice signal 2 is supplied, and reaches the horizontal terminal block 13, then continues to the intermediate distributor 7, then continues until it reaches the filter or splitter 4, which combines or separates the voice signal 2 and the high-speed signal xDSL 5, which is provided by the Digital Subscriber Line Access Multiplier (DSLAM) 3 from a network 9, thus providing the combined signal 6 which once again reaches the intermediate distributor 7, and subsequently continues to the vertical terminal block 14. From this vertical terminal block 14 the combined signal passes via a filter 17 which separates the voice signal from the high-speed signal xDSL, which end up respectively in the telephone device 11 or in computer 12.

In order to determine a point of demarcation and study both ends, it is necessary to take the combined voice and high-speed signal xDSL to a test rack 10. In order to obtain this point of demarcation, various solutions are known, such as those which are shown in FIGS. 2 and 3, and are described hereinafter.

Figure 2:
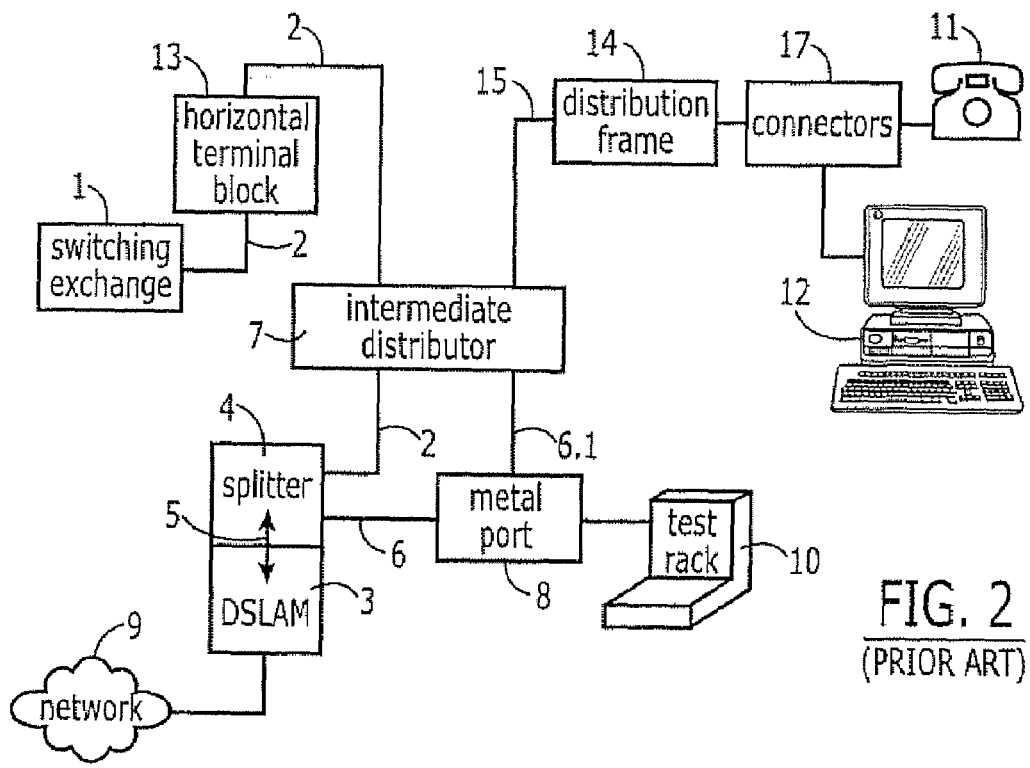
FIG. 2 (Prior Art) shows a similar known architecture, in which the metal port takes the form of a rack outside the intermediate distributor.

FIG. 2 shows the known architecture in which the metal port 8 consists of a rack which is independent from the intermediate distributor 7, such that, starting with a fixed architecture such as that shown in FIG. 1, the combined signal 6 is disconnected and is transferred to the metal port 8, such that subsequently, and using another cable, this signal 6.1 reaches the intermediate distributor 7. From the metal port 8 it is conveyed to the test rack 10.

Figure 3:
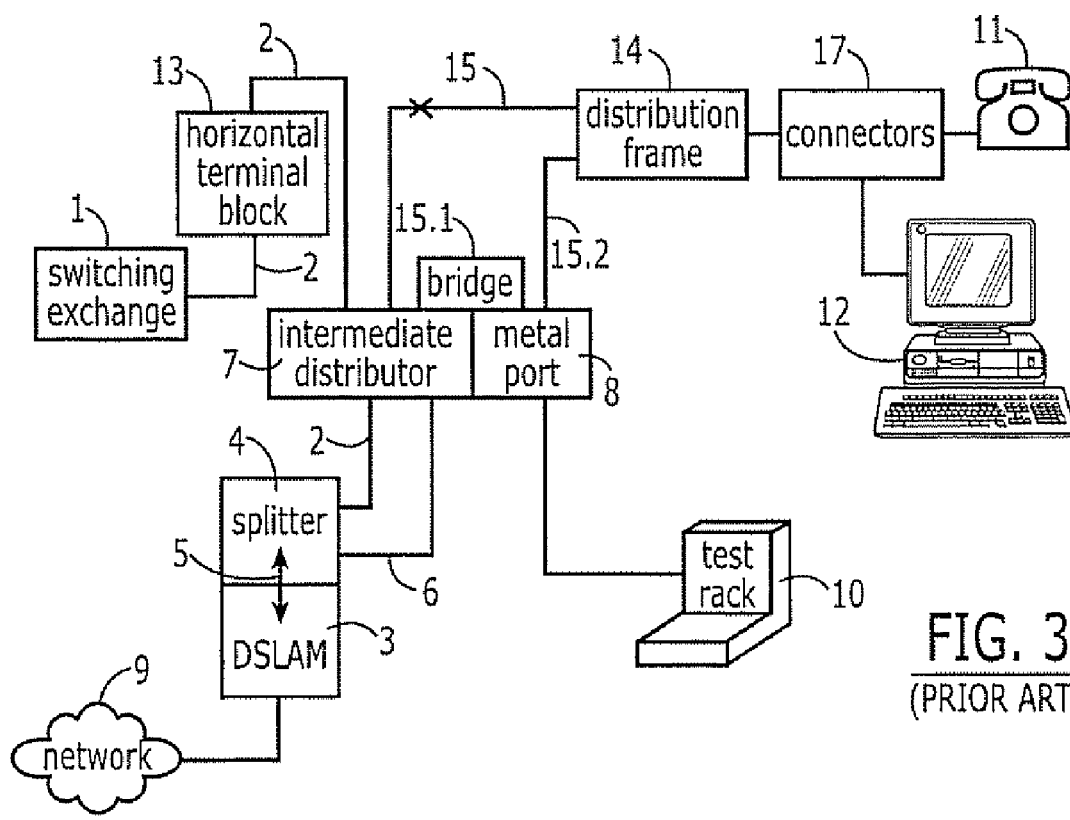
FIG. 3 (Prior Art) shows a similar known architecture, in which the metal port takes the form of an additional terminal block which is disposed adjacent to the terminal block of the intermediate distributor.

FIG. 3 shows the known solution consisting of placing on the intermediate distributor 7 and adjacent to it, the metal port 8, which requires rewiring of the bridge 15 for the combined signal, with the need for a bridge 15.1 between the intermediate distributor 7 and the metal port 8, and another 15.2 from the latter to the vertical terminal block 14. This also presupposes duplication of space in the intermediate distributor.

Figure 4:
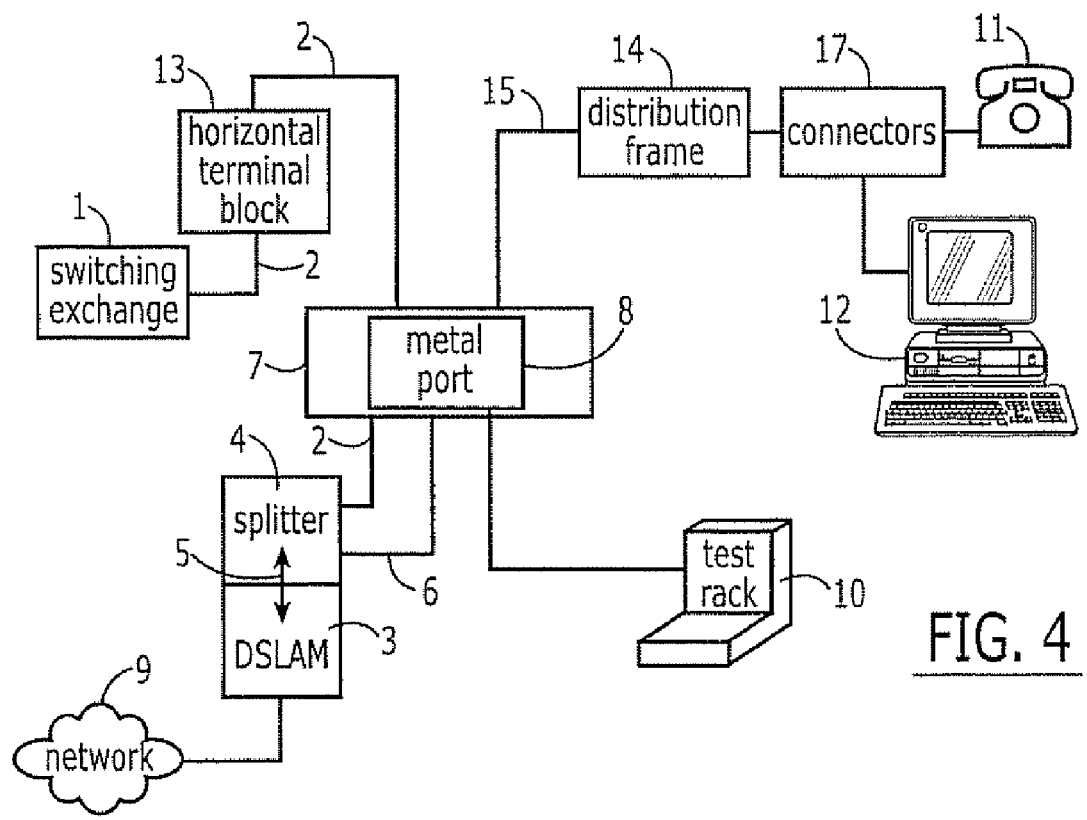
FIG. 4 shows a preferred form of the present invention.

FIG. 4 shows the solution now proposed according to the present invention, wherein, without needing to disconnect or reconnect the wiring, and without taking up more space, it is possible to obtain a metal contact for the lines, simply by placing the metal port block 8 on the terminal block of the intermediate distributor 7.

Figure 5:
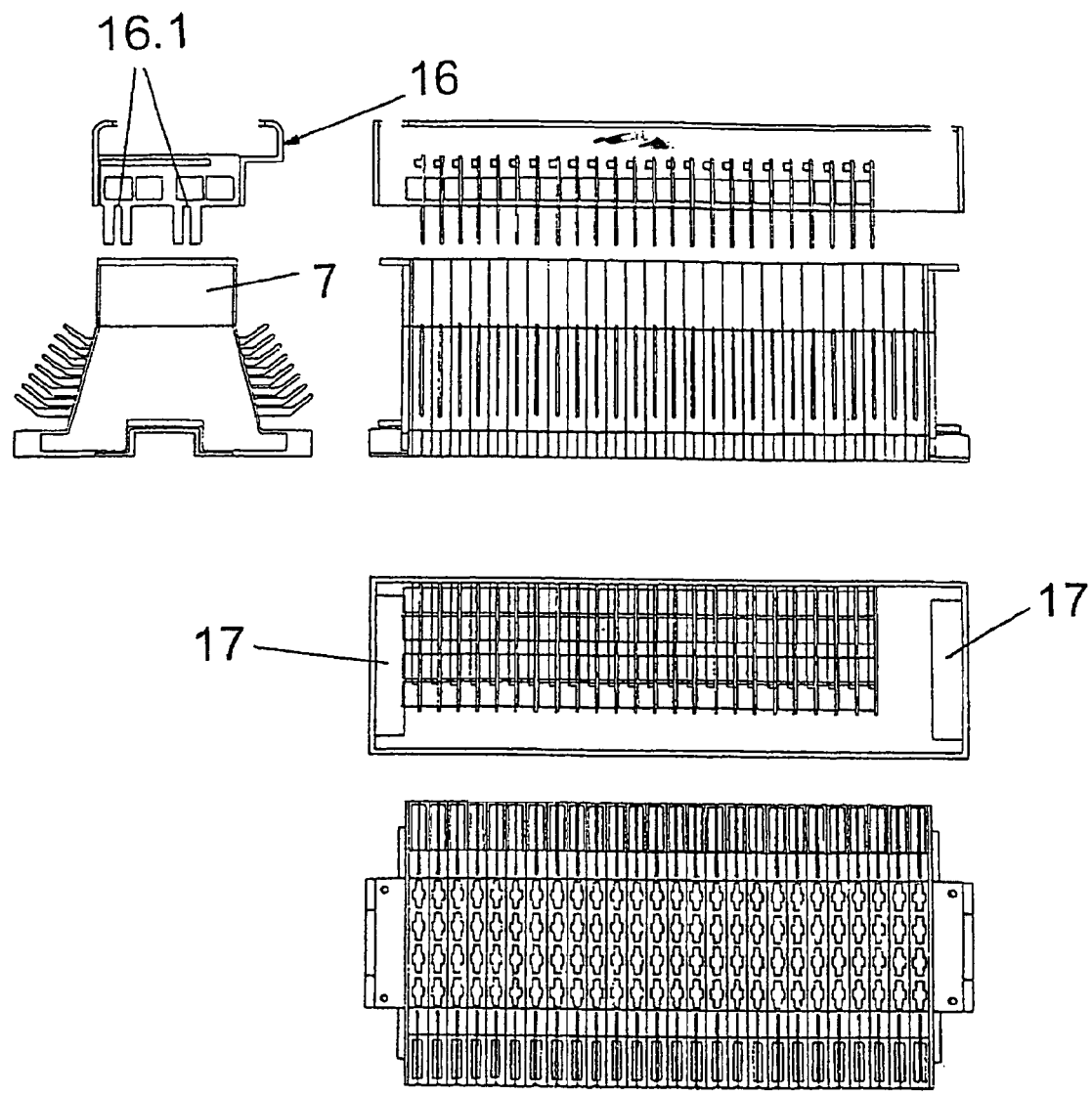
FIG. 5 shows an elevated, plan and profile representation of a block for obtaining the metal port signal disposed on the terminal block of the intermediate distributor.
Figure 6:
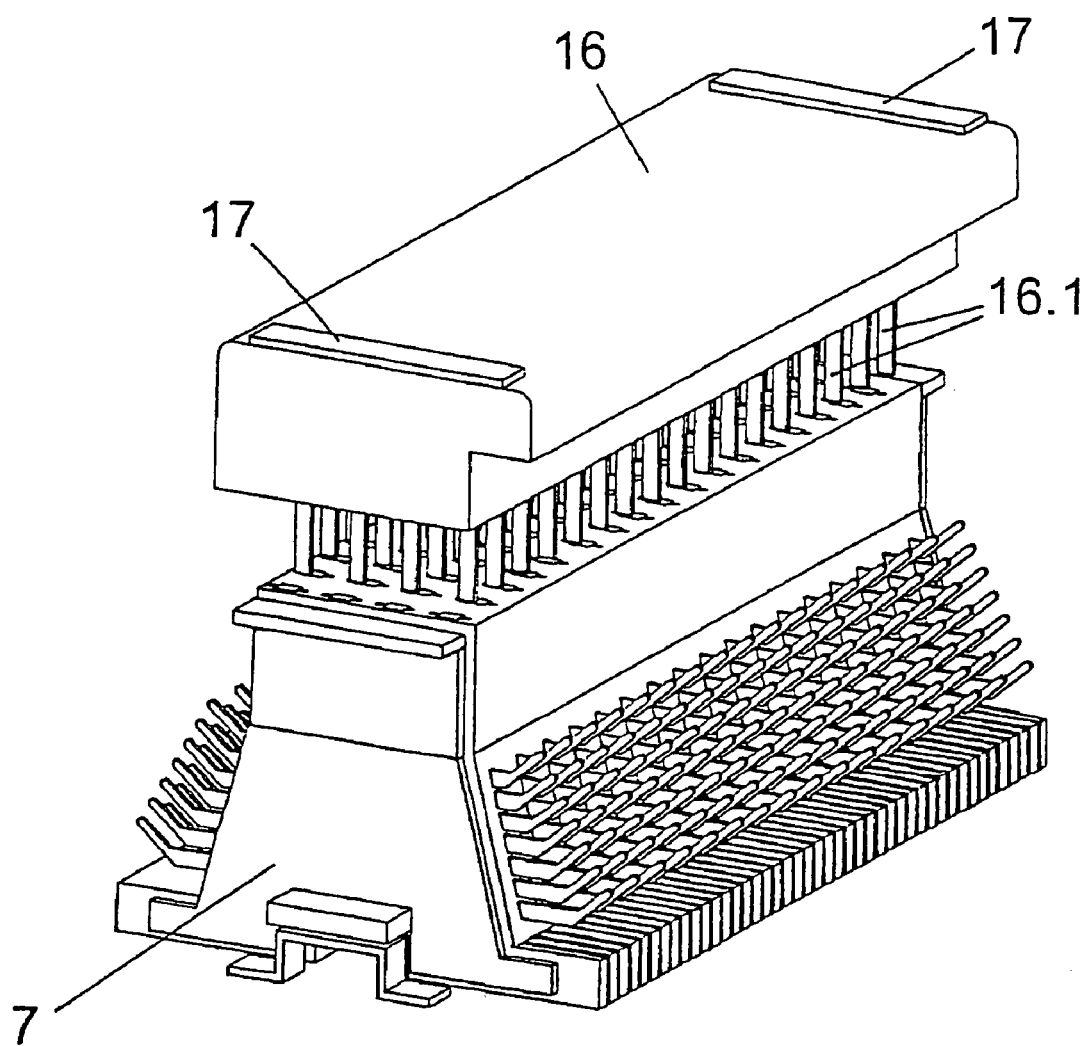
FIG. 6 shows the previous representation in perspective.

FIGS. 5 and 6 show a non-limiting representation of the terminal block of the intermediate distributor, on which there is disposed the block 16 in order to obtain the metal port signal. This block 16 has only the contact walls 16.1 which are necessary, disposed corresponding to the cavities of the pairs for the combined signals, i.e. voice signal plus high-speed signal xDSL. If it is wished to have a metal port for the voice signals, it will be sufficient for the metal contacts 16.1 of the block 16 to be disposed corresponding to the voice signals of the intermediate distributor. It can also be seen that at the ends of the metal port block 16 there are some connectors 17 for connection between the different blocks, by means of a bus.

Figure 7:
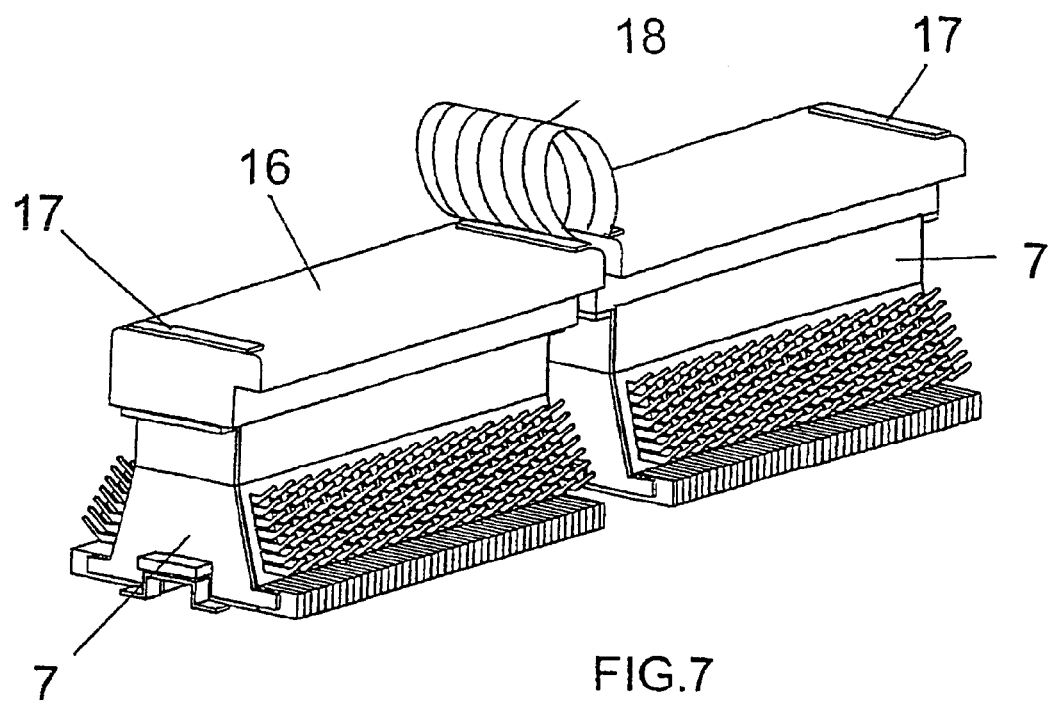
FIG. 7 shows two metal port blocks aligned and connected to one another.

FIG. 7 shows two metal port blocks which are aligned and connected to one another by means of a bus 18, with connection to the test rack by means of a single bus.

Figure 8:
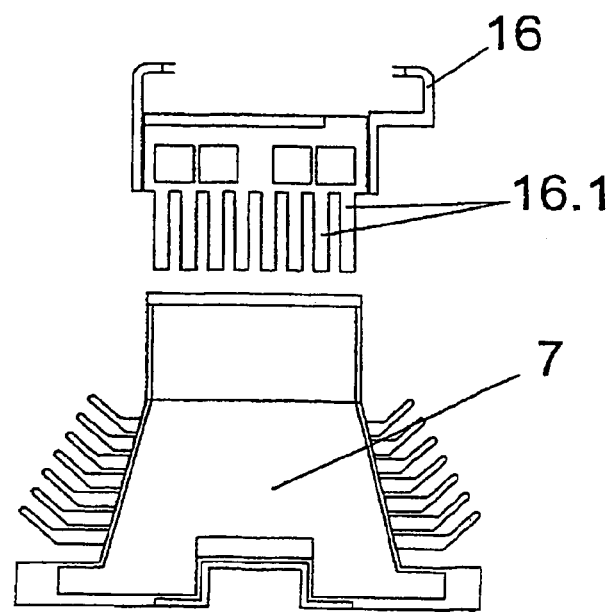
FIG. 8 shows the form the metal port block takes when it is connected to the vertical terminal block.

FIG. 8 shows the form adopted by the metal port block when it is disposed on the vertical terminal block. This block will have the same number of pairs of metal contacts as there are lines to be controlled.

Further improvements according to the present invention have the purpose of allowing metallic accesses to be established, i.e. those which permit inspecting the lines from a test table, in the vertical distribution frame i.e. in the distribution frame on the subscriber's side, as well as defining specific connecting blocks adapted to different types of distribution frames.

In the invention hereinbefore described, whose object is avoiding wiring operations being carried out in the connection architecture for xDSL lines with metallic access, in order to have the combined signal in a test table which permits knowing the status of both the subscriber loop and the multiplexer (DSLAM) or equipment, it is in one form designed that the metallic access is established on a connecting block, provided with pairs of contacts to be connected to the pairs of combined signals, i.e. voice plus high-speed xDSL signal, existing in the intermediate distribution frame, of which specific embodiments are described, designed for a specific type of distribution frame. The invention includes the alternative that to establish the metallic access to the test table, said connecting block could be coupled with the vertical distribution frame, i.e. the subscriber side distribution frame, of which specific embodiments will be hereinafter described.

The further improvements that the present invention now proposes constitute specific solutions relating both to the location of the metallic access unit in relation to the vertical distribution frame, and to specific embodiments of said unit to adapt it to different distribution frame connecting blocks, i.e. to distribution frames with connecting blocks with different "anatomies".

Specifically, and in accordance with one of the characteristics of the invention, the metallic access service to all the lines with voice, special (voice+data, ISDN, etc) service and without service, is located in the vertical distribution frame. The existing strips in the distribution frames (7–14) may have their protection in the patch and test point or in the separate area of this patch and test point.

In those strips wherein the patch and test point is separate from the protection point, the metallic access is established through the side where said protection point is positioned. The metallic access forms part of an essentially prismatic-rectangular or cartridge housing which contains the classic relays and associated electronics, joining the metallic access block and the and the cartridge that contains it, with the aid of a connector, there also being connectors for the bus, which link the different metallic accesses, in the cartridge.

In those strips wherein the patch and test point coincides with the protection point, the latter receive, in said point, a cartridge which, as in the previous case, has the relays and associated electronics, a cartridge which, in this case, is provided with an optional folding access lid.

Figure 9:
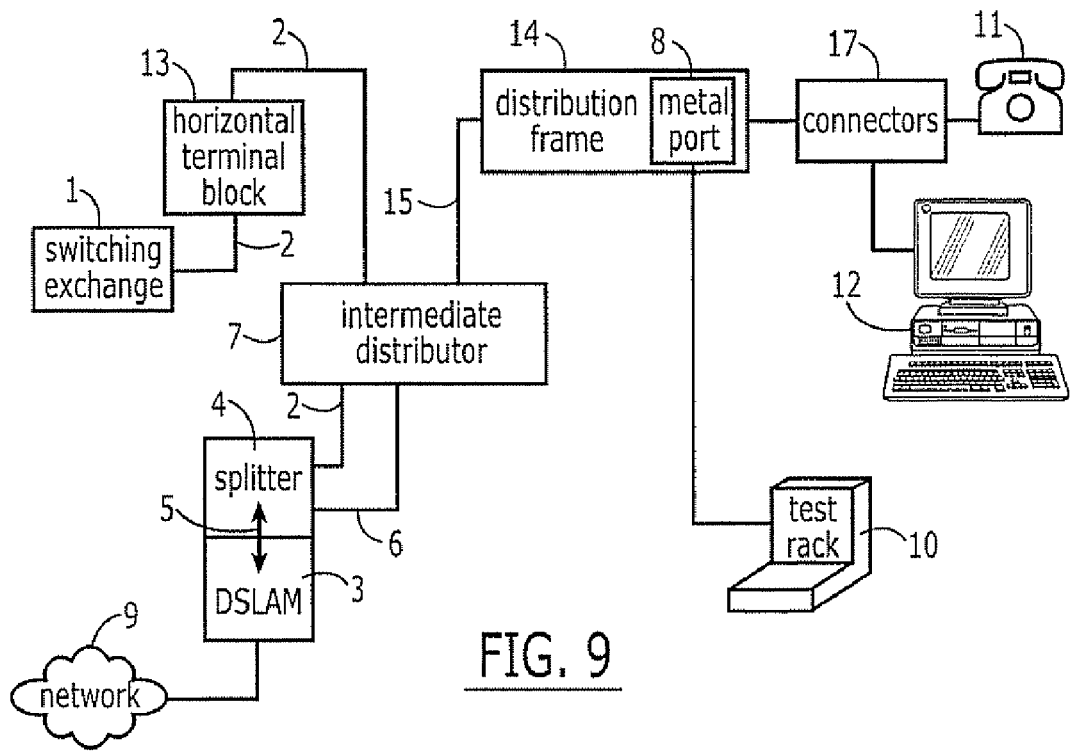
FIG. 9 shows the connection architecture for xDSL networks with the metallic access established in the vertical distribution frame.

Referring to FIGS. 9 to 13, and particularly to FIG. 9, it can be observed how a voice signal is supplied (2) from the switching exchange (1) to a horizontal distribution frame (13) from where said signal continues until an intermediate distribution frame (7), from where it continues to the filter or splitter (4) which joins or separates the voice signal (2) and the high-speed xDSL signal (5) provided by the digital subscriber line access multiplexer (DSLAM) (3) from a network (9), obtaining the combined signal (6) that again passes to the intermediate distribution frame (7), from where it continues to the vertical distribution frame (14), after which the combined signal passes through a filter (17) where the voice signal and the high-speed xDSL signal are separated, said signals ending in the telephone apparatus (11) and in the computer (12). The metallic access (8) located in the vertical distribution frame (14) gathers the information from said distribution frame and supplies it to the test table (10).

Figure 10:
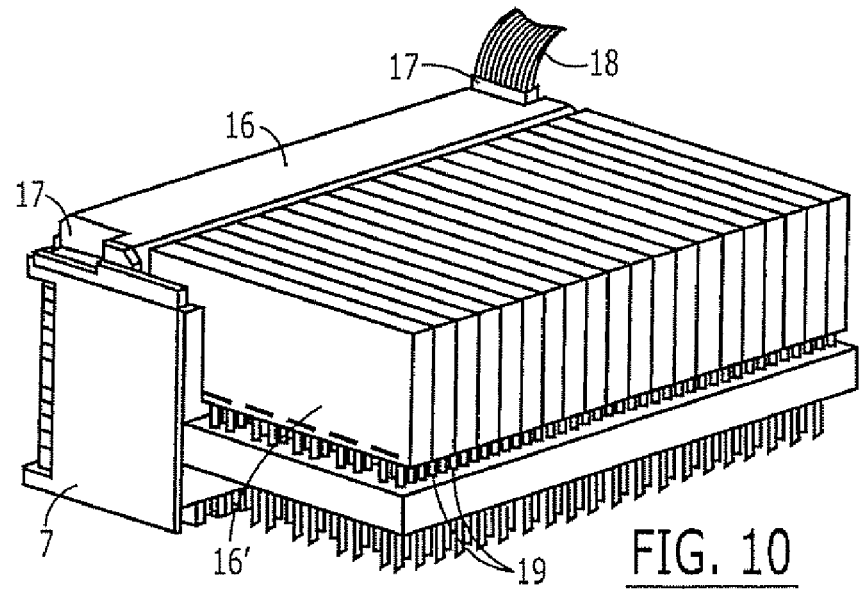
FIG. 10 shows a schematic perspective representation of a connecting block adapted to the corresponding distribution strip.
Figure 11:
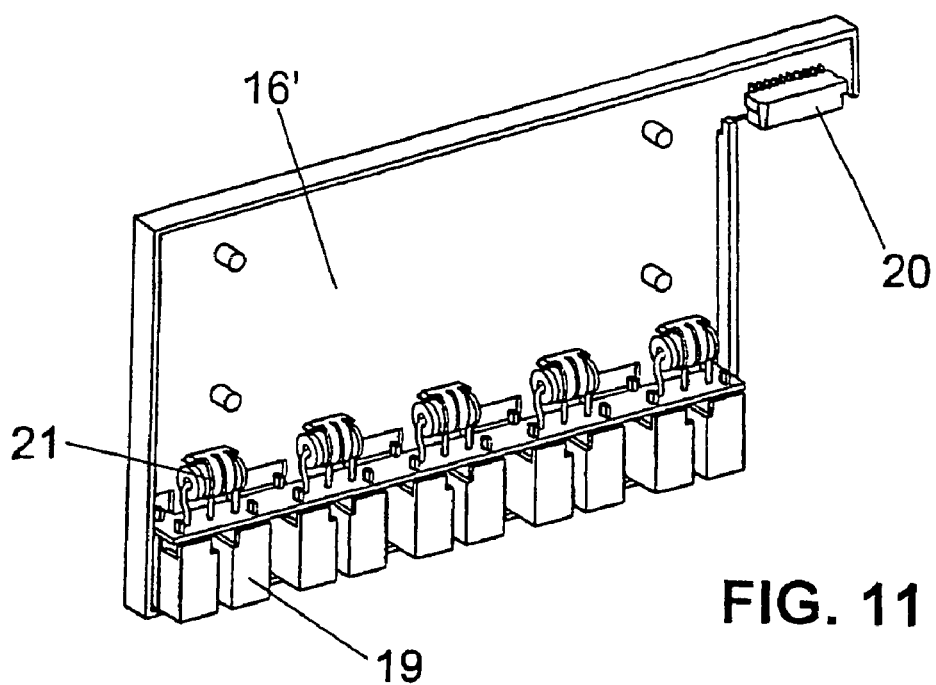
FIG. 11 also shows a perspective view of a detail of one of the connecting boards included in the cartridge of the previous figure.

Turning to FIGS. 10 and 11, a different type of distribution block 7 (or 14) is represented, essentially characterized in that the protection point is separated from the telephone pairs connection and the patch and cut area, the connecting block for data gathering forming a block (16) whereto a plurality of boards (16') can be coupled arranged in array in the form of cartridges, one of which is represented in detail in FIG. 3, boards (16') provided with the corresponding connecting points (19) of the protection connection which, in turn, are linked to the block (16) by their respective connectors (20), each board having the corresponding, relays (21) and associated electronics. As can be easily verified in view of FIG. 10, these boards (16') can be easily coupled with and uncoupled from the distribution frame (7) or (14) by simple vertical displacement. Furthermore, the connecting block (16) incorporates connectors (17) at the ends thereof for the bus (18) which permits the blocks to interconnect.

Figure 12:
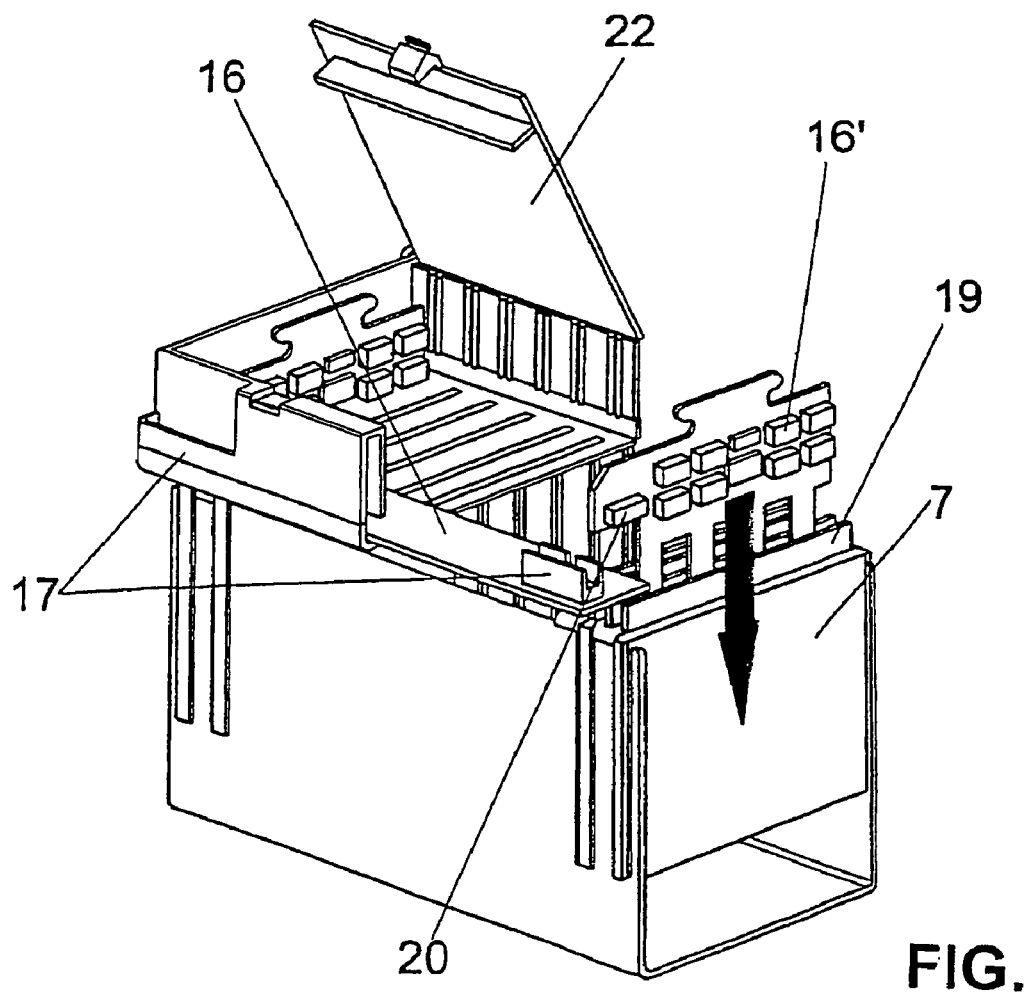
FIG. 12 shows another schematic, perspective representation and another solution for the metallic access cartridge, adapted for another type of distribution block.

In the embodiment in FIG. 12, the distribution block 7 (or 14) adopts a generally prismatic-rectangular shape, and the boards (16') are arranged on a block (16) aided by an upper, folding lid (22), said boards (16') having the same connecting points (19) and the same connectors (20), whilst the cartridge (16) also has similar connectors (17) for the cartridge interconnection bus.

Figure 13:
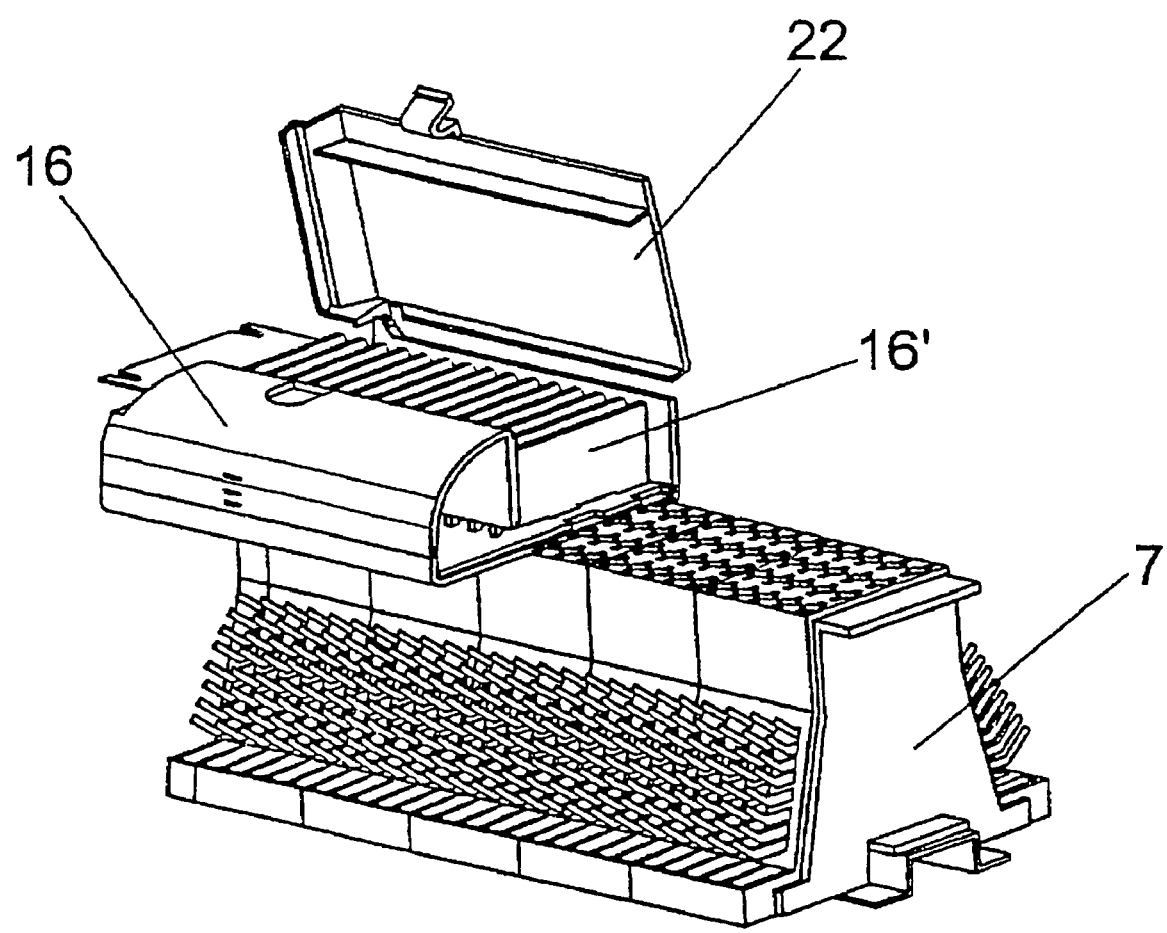
FIG. 13 shows, according to a similar representation to that of FIG. 4, another embodiment for the metallic access cartridge, corresponding to another type of distribution strip, and, as in the above case appears with its housing open and partially sectioned.

Finally, FIG. 13 represents the specific solution designed for the connecting block (16) corresponding to a distribution block 7 (or 14) hereinbefore described, and it is observed how, in this case, the cartridge (16) also has a folding lid (22) to access the boards (16'), with the relays and associated electronics, established therein, also vertically.

The materials, form, size and arrangement of the elements can vary, provided that this does not affect the substance of the invention.

The invention claimed is:

1. A connection architecture for an xDSL network with a metal port, the architecture comprising:
   a switching exchange electrically connected to a terminal of an intermediate distribution frame via a terminal block of a horizontal distribution frame, the intermediate distribution frame being configured to provide a voice signal to a filter and/or a splitter and a DSLAM, wherein the DSLAM is configured to receive an xDSL signal from a network and the filter and/or splitter is or are configured to provide a combined voice and xDSL signal to the intermediate distribution frame;
   a terminal block of a vertical distribution frame configured to receive the combined voice and data signal from the intermediate distribution frame and to transmit the combined signal to a separation filter, the separation filter being configured to output a voice signal and a data signal, the intermediate distribution frame or the terminal block of the vertical distribution frame comprising a connection element that includes cut-off and test contacts;
   wherein a metal port block disposed on the connection element of the vertical or horizontal distribution frame is configured to obtain a signal from the metal port to be conveyed to a test rack without disconnecting the filter and/or splitter.

2. A connection architecture according to claim 1, further comprising a metal port block that comprises the metal port and is disposed on a terminal of the intermediate distribution frame, the metal port block including a set of pairs of contacts on a base thereof, which are disposed corresponding to cavities which are provided in the terminal block of the intermediate distribution frame, which correspond to contacts which transmit the combined voice and xDSL signal.

3. A connection architecture according to claim 2, wherein the pairs of contacts are disposed corresponding to the cavities corresponding to the contacts for the voice signal which exist on the terminal of the intermediate distribution frame.

4. A connection architecture according to claim 1, further comprising a metal port block that comprises the metal port, the metal port block being disposed on the terminal block of the vertical distribution frame, the metal port block having on a base thereof a set of pairs of contacts which are disposed corresponding to cavities in the terminal block of the vertical distribution frame which correspond to contacts of the combined voice and xDSL signal.

5. A connection architecture according claim 2, comprising a connector configured to be connected to one or more adjacent metal port blocks by a bus.

6. A connection architecture according to claim 1, wherein the metal port through which the metallic access to the intermediate distribution frame or the terminal block of the vertical distribution frame is made, is a metal port comprising a plurality of boards, containing electrical components, each one of the boards having contact pins or plugs on a lower edge of the board, to be housed in cavities for a patch and test or protection area of the intermediate distribution frame or of the terminal block of the vertical distribution frame.

7. A connection architecture according to claim 6, wherein the plurality of boards are arranged in an array or cartridges and have connectors for interconnection of the cartridges into an array.

8. A connection architecture according to claim 7, wherein the connectors that interconnect the cartridges in array include buses.

9. A connection architecture according to claim 6, wherein the metal port block includes a housing, and the boards are configured as cartridges having lids, which, when coupled with the housing, provide a closed outer surface which protects electrical components thereof.

10. Connection architecture according to claim 6 wherein the boards are laminated, and/or incorporate the electrical components on one or both sides, and/or are protected within a housing.

11. A metal port block for use in the connection architecture according to claim 1, wherein the metal port block comprises the metal port and is disposed on the terminal of the intermediate distributor, the metal port block including a set of pairs of contacts on a base thereof, which are disposed corresponding to cavities which are provided in the terminal block of the intermediate distributor, which correspond to contacts which transmit the combined voice and xDSL signal.

12. A metal port block according to claim 11, wherein the pairs of contacts are disposed corresponding to the cavities corresponding to the contacts for the voice signal which exist in the terminal of the intermediate distributor.

13. A metal port block for use in the connection architecture according to claim 1, wherein the metal port block comprises the metal port, the metal port being disposed on the terminal block of the vertical distribution frame, such that the terminal block has on a base thereof a set of pairs of contacts which are disposed corresponding to cavities in the terminal block of the vertical distribution frame, which correspond to contacts of the combined signal.

14. A terminal metal port block according claim 11, comprising a connector configured to be connected to the one or more adjacent metal port blocks by a bus.

15. A connection architecture according to claim 10, wherein the cartridge comprises an upper or folding lid.

16. A cartridge for insertion in a metal port access block for use in the connection architecture according to claim 1, wherein the cartridge is adapted for being disposed on a terminal block of the intermediate distributor or a terminal block of the vertical distributor to thereby obtain a test access to a metal port, the cartridge having contact pins or plugs, on the lower edge to be housed in cavities providing connections for the patch and test or protection area of a distribution frame, and connectors for linking the cartridge to the metal port block.

17. A metal port block according claim 13, comprising a connector configured to be connected to the one or more adjacent metal port blocks by a bus.

18. A connection architecture for a xDSL network with a metal port, the architecture comprising:
   a switching exchange electrically connected to a terminal of an intermediate distribution frame via a terminal block of a horizontal distribution frame, the switching exchange configured to provide a voice signal to a filter and/or splitter and a DSLAM, wherein the DSLAM is configured to receive an xDSL signal from a network and the filter and/or splitter is or are configured to provide a combined voice and xDSL signal to the intermediate distribution frame;
   a vertical block of a vertical distribution frame configured to receive the combined voice and xDSL signal from the intermediate distribution fame and to transmit the combined signal to a separation filter, the separation filter being configured to output a voice signal and a data signal wherein the intermediate distribution frame or the terminal of the vertical distribution frame comprises a connection element that includes cut-off and test contacts; and
   a metal port block on the connection element, wherein the metal port block is configured so that a signal can be obtained from the metal port and conveyed to a test rack without disconnecting the filter and/or splitter.

19. A method of providing test access in a connection architecture for xDSL networks, wherein the architecture is configured so that the voice signal is obtained from a switching exchange, reaches a terminal block of a horizontal distributor, continues to an intermediate distributor and to an assembly formed by a filter or splitter and a DSLAM, which supplies a highspeed digital signal xDSL from a network, the assembly being configured to emit a combined voice and xDSL signal which reaches the intermediate distributor, and is transmitted to a terminal block of a vertical distributor and to a subsequent separation filter so that the combined voice and xDSL signal thereby reaches a user either on a telephone or on a computer, the intermediate distributor or the vertical terminal block having a connection element which has cut-off and test contacts, the method comprising:
   providing a metal port block on a connection element of the intermediate distributor or on the terminal block of the vertical distributor;
   obtaining a metal port signal from the metal port block for conveying to a test rack, without disconnecting or reconnecting a bridge and/or a cable of the connection architecture.

* * * * *